Figure 6:
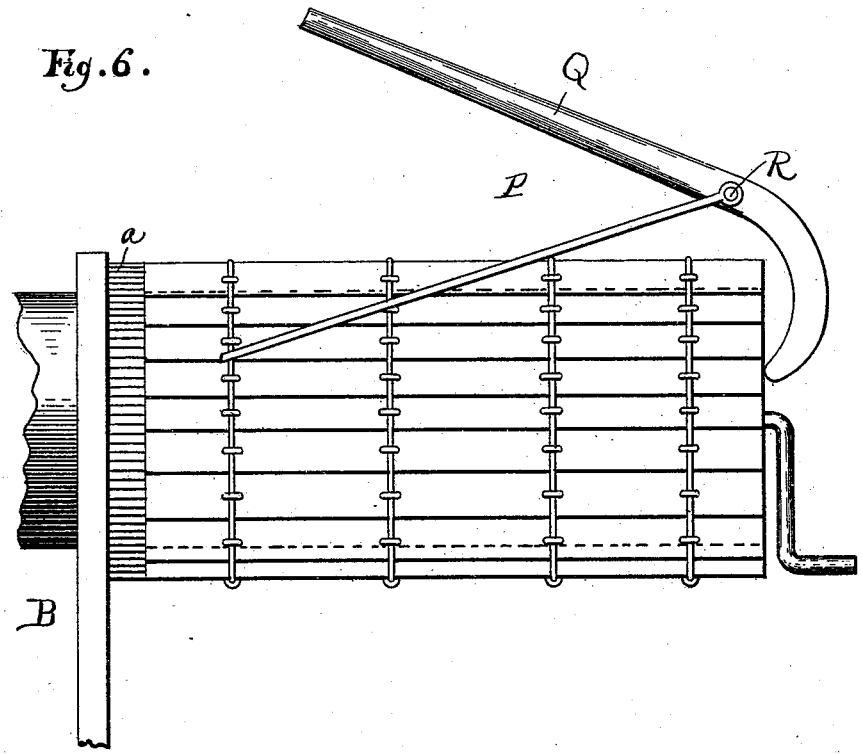

(No Model.)
G. S. PASQUITH.
MACHINE FOR MAKING BARRELS.
No. 494,260. Patented Mar. 28, 1893.
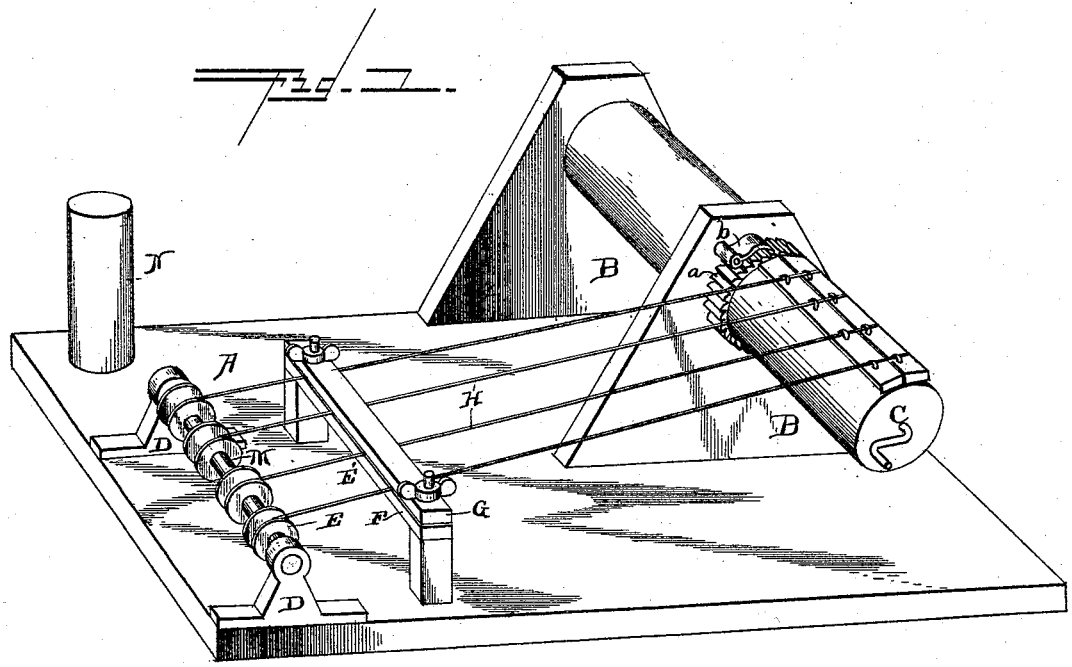
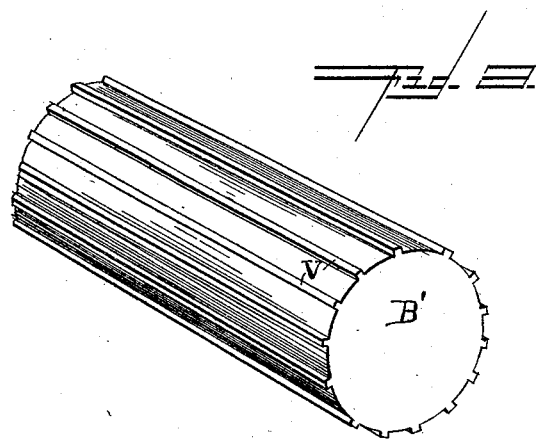
WITNESSES
C. S. Frye
N. H. Lochrey
INVENTOR:
Gomer S. Pasquith
By W. T. Fitzgerald & Co.
Attorneys (No Model.) 3 Sheets—Sheet 2.
G. S. PASQUITH.
MACHINE FOR MAKING BARRELS.
No. 494,260. Patented Mar. 28, 1893.
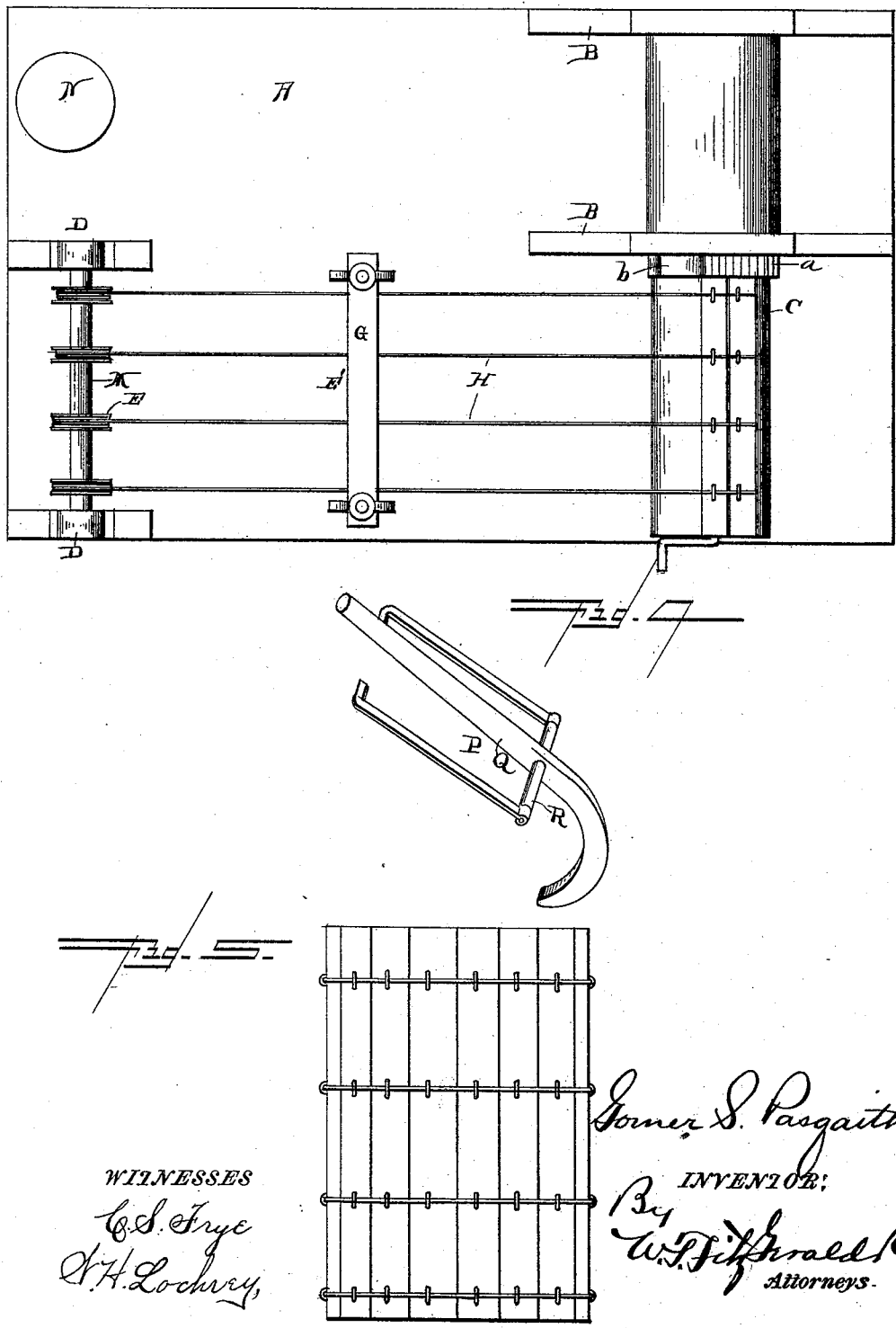

(No Model.) 3 Sheets—Sheet 3.

G. S. PASQUITH.
MACHINE FOR MAKING BARRELS.

No. 494,260. Patented Mar. 28, 1893.

WITNESSES.
C. S. Frye
G. T. Myers

Gomer S. Pasquith
Inventor

W. T. FitzGerald & Co.
Attorneys.

UNITED STATES PATENT OFFICE.

GOMER S. PASQUITH, OF CHASE'S WHARF, VIRGINIA.

MACHINE FOR MAKING BARRELS.

SPECIFICATION forming part of Letters Patent No. 494,260, dated March 28, 1893.

Application filed December 22, 1891. Serial No. 415,888. (No model.)

*To all whom it may concern:*

Be it known that I, GOMER S. PASQUITH, a citizen of the United States, residing at Chase's Wharf, in the county of Lancaster and State of Virginia, have invented certain new and useful Improvements in Machines for Making Barrels; and I do hereby declare the following to be a full, clear, and exact description of the invention, such as will enable others skilled in the art to which it appertains to make and use the same.

My invention has relation to improvements in barrel making machines, and its novelty will be fully understood from the following description and claim when taken in conjunction with the accompanying drawings, in which:

Figure 1 is a perspective view of my improved machine; a barrel being illustrated in the course of construction. Fig. 2 is a plan view of the same. Fig. 3 is a detail perspective view illustrating a modified construction of forming shaft. Fig. 4 is a perspective view of an implement for removing the barrel blank from the forming shaft, and Fig. 5 is an elevation of a barrel made by my improved machine. Fig. 6, is a side elevation of the stripping implement with the lever in operative position.

In the said drawings, the same letters designate corresponding parts throughout the several views, referring by letter to which:

A, indicates the base of my improved machine, which may be formed from wood or other suitable material.

Rising from the base, A, and preferably at points off the longitudinal center of the same are two parallel standards, B, in which is journaled the forming shaft, C, which is preferably rotated by hand through the medium of a crank, or the like. This shaft C, which is extended laterally from the standard, as illustrated, to support the barrel while the same is being formed, is provided adjacent to one of said standards with beveled ratchet teeth, *a*, designed to be engaged by a gravitating pawl, *b*, which is pivotally connected to the side of the standard and serves, in practice, to prevent backward rotation of the forming shaft.

Journaled in standards, D, rising from the base, A, is a horizontal, rotatable shaft, M, upon which is fixed, preferably at equidistant points, a series of spools, E, upon which are wound the several wires for connecting the staves of the barrel.

Arranged intermediate of the wire carrying spools E and the forming shaft, C, is a tension regulator, E', which comprises a transverse base bar, F, an adjustable transverse bar, G, and screws, or the like for adjusting and adjustably fixing the bar, G, with respect to the bar, F, so as to bind the stave-connecting or hoop wires, H, against said base bar and thus prevent a too rapid feed of said wire to the forming shaft.

Rising from the base, A, at a suitable point, is a preferably cylindrical upright or post, N, which serves, in practice, to gage the distance of the barrel head from the end of the staves after said staves have been connected.

P, indicates an implement for removing the connected staves from the forming shaft, after the barrel blank has been completed. This implement, P, which may be formed from any suitable material, comprises the lever, Q, which has its lower end beveled to bear against the end of the forming shaft and is provided with the lateral branches, R, and the arms connected to the ends of the lateral branches and having angular branches at their free ends for engaging the inner ends of the barrel staves.

The forming shaft illustrated in Figs. 1 and 2 of the drawings, which has a plain surface, is designed for use in the construction of tight barrels or barrels in which the longitudinal edges of the staves are brought and held together.

In Fig. 3 of the drawings I have provided a modified construction of forming shaft which is designed for use in the construction of truck or other barrels where it is desirable to have a space between the longitudinal edges of the staves. Referring to the said figure: B', indicates the forming shaft, which is provided upon its periphery with a series of londitudinally disposed ribs, V, which are arranged at equal intervals and are designed to space or hold the staves apart while the same are being connected and formed into a barrel.

In operation, a stave is placed longitudinally upon the extended portion of the forming shaft, C, and is secured to said shaft, by any suitable means. The ends of the hoop wires, which are passed between the bars, F and G of the tension regulator, are then connected to the secured stave at intervals in the length thereof, by staples, or the like, after which another stave is placed against the secured stave and beneath the hoop wires, which are secured to the second stave in the same manner as the first or secured stave. The forming shaft is then slightly rotated, when another stave is placed and secured in position, and so on until the entire periphery of the forming shaft is covered with staves, when the hoop wires are cut and the ends of said wires are then clinched or otherwise connected. The implement, P, is then brought into play as hereinbefore described and the barrel blank is pulled off the forming shaft. The said blank is then placed over the gage post or upright, N, and a head is introduced between the staves and driven downwardly until it rests upon the said gage post, when it is secured in the ordinary or any approved manner.

From the foregoing description, taken in connection with the accompanying drawings, it will be readily perceived that I have provided a cheap, simple and durable machine adapted to quickly form a very light and strong barrel.

No claim is herein made to the implement P, which is designed to form the subject matter of a separate application to be subsequently filed.

Having thus described my invention, what I claim, and desire to secure by Letters Patent, is—

In a barrel forming machine, the base A, having standards B, the forming shaft C with an operating crank journaled in said standards, so as to leave one end of the shaft free for the removal of the finished barrel, in combination with the wire holding spools E mounted on a shaft M journaled in the standards D, the tension device F, G through which the wires pass, the ratchet wheel $a$, and gravitating pawl $b$, whereby the backward motion of the forming shaft is prevented, substantially as specified.

In testimony whereof I affix my signature in presence of two witnesses.

GOMER S. PASQUITH.

Witnesses:
EMMA M. GILLETT,
W. F. FITZ GERALD.